United States Patent
Oh et al.

(10) Patent No.: US 6,424,664 B1
(45) Date of Patent: Jul. 23, 2002

(54) BRILLOUIN/ERBUIM FIBER LASER OUTPUTTING DUAL SPACING MULTIWAVELENGTH LIGHT

(75) Inventors: Wang-Yuhl Oh; Joon-Hak Bang; Sang-Soo Lee; Hyun-Jae Lee; Je-Soo Ko; Wan-Seok Seo, all of Taejon (KR)

(73) Assignees: Electronics and Telecommunications Research Institute, Taejon; Korea Telecom, Sungram-shi, both of (KR)

( * ) Notice: Subject to any disclaimer, the term of this patent is extended or adjusted under 35 U.S.C. 154(b) by 0 days.

(21) Appl. No.: 09/497,344

(22) Filed: Feb. 3, 2000

(51) Int. Cl.⁷ ................................................. H01S 3/30
(52) U.S. Cl. .......................... 372/6; 372/23; 372/92; 372/99; 372/39; 385/42
(58) Field of Search ................. 372/99, 94, 6, 372/72, 23, 70, 71, 39; 356/345; 359/115, 127; 385/39, 42

(56) References Cited

U.S. PATENT DOCUMENTS 5,778,014 A * 7/1998 Islam .......................... 372/6
6,052,393 A * 4/2000 Islam .......................... 372/6

* cited by examiner

*Primary Examiner*—Leon Scott, Jr.
(74) *Attorney, Agent, or Firm*—Jacobson Holman, PLLC

(57) ABSTRACT

Disclosed is a Brillouin erbium-fiber laser system producing multiwavelengths with a dual spacing of 10 GHz and 20 GHz. The Brillouin erbium-fiber laser system includes: a Sagnac reflector generating even- and odd-order Strokes waves by launching input lights, a first unit forming a first resonator with the Sagnac reflector, wherein the first unit is coupled to a first directional coupler in the Sagnac reflector, a second unit forming a second resonator with the Sagnac reflector, wherein the second unit is coupled to the first directional coupler in the Sagnac reflector, and a third unit for inputting Brillouin pump light into one of first and the second units, whereby the optical fiber laser system outputs multiwavelengths with a dual spacing.

7 Claims, 3 Drawing Sheets

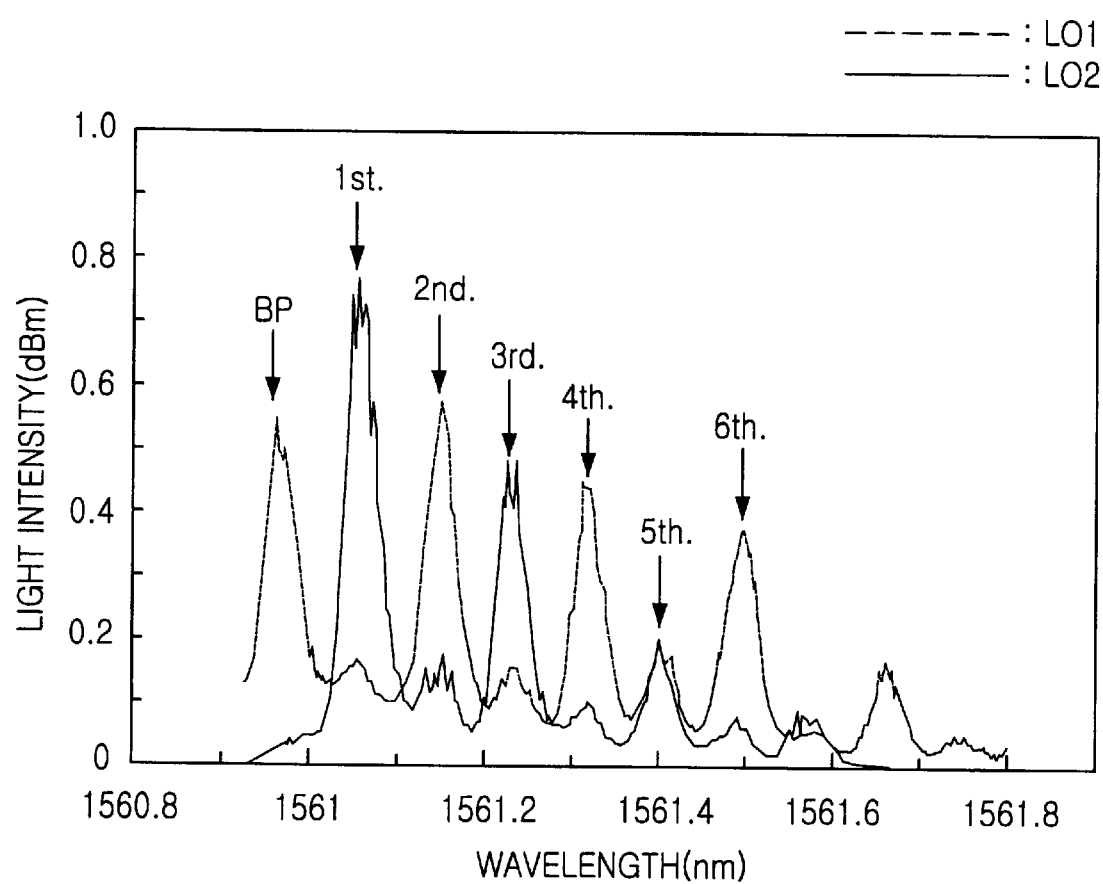

BRILLOUIN/ERBUIM FIBER LASER OUTPUTTING DUAL SPACING MULTIWAVELENGTH LIGHT

FIELD OF THE INVENTION

The present invention relates to a laser system producing multiwavelength light and, more particularly, to a Brillouin/erbium-fiber laser system producing multiwavelengths with a dual spacing of 10 GHz and 20 GHz.

DESCRIPTION OF THE PRIOR ARTS

In wavelength division multiplexing optical communications, a Brillouin/erbium-fiber laser outputting multiwavelengths has been widely developed. However, it is not proper the Brillouin/erbium-fiber laser to be applied to actual optical communications because the spacing between the multiwavelengths to be outputted is so narrow compared to the 100 GHz wavelength spacing, which is currently used.

When high intensity light is incident on nonlinear optical materials, the first order Stokes wave is generated in the reverse direction by the interaction between the incident photons and acoustic phonons, which is so-called "Stimulated Brillouin Scattering".

Brillouin gyroscopes using the Stimulated Brillouin Scattering in optical fibers have been studied and, moreover, there are many researchers on the Brillouin/erbium-fiber laser, Brillouin optical fiber interferometers and Brillouin optical fiber laser interferometers.

One of notable paper is "Brillouin/erbium fiber laser," by G. J. Cowle, et al., which is published in "IEEE J. Lightwave Technol." In this paper, Brillouin/erbium-fiber laser outputting 10 GHz spacing unidirectional multiwavelength waves has been presented, in which optical signals, resonating unidirectionally in a ring-type laser cavity, feed back in the opposite direction thereto.

Further, in the paper of "Multiwavelength operation of Brillouin/erbium-fiber lasers with injection-locked seeding" by G. J. Cowle, et al., another Brillouin/Erbium optical fiber laser structure of bidirectional multiwavelength has been proposed in a spacing of 20 GHz, by using the ring-type laser structure. However, only 20 GHz spacing multiwavelength waves can be outputted.

In "Generation of multiorder Stokes and anti-Stokes lines in Brillouin/Erbium-fiber laser with Sagnac loop mirror," "Optics Letters," 1988, Vol. 23, No. 21, instead of the ring-type laser structure, a Brillouin/erbium-fiber laser structure of the Sagnac resonator structure is proposed, but such an optical fiber laser obtains 10 GHz spacing multiwavelength outputs only.

As stated above, the conventional optical fiber laser can obtain multiwavelength optical outputs having only one spacing of 10 GHz or 20 GHz. However, an optical fiber laser capable of obtaining multiwavelenths of a dual spacing of 10 GHz and 20 GHz has not been presented to date.

Moreover, the proposed fiber laser may be used as a sensor. Namely, if the fiber laser capable of providing the multiwavelength output of a dual spacing is employed, it may be used as an optical fiber sensor. The variation of physical objects, such as temperature, pressure, current, magnetic field, and so on, can be used by measuring the relative variation of light intensity of 10 GHz and 20 GHz spacing signals.

SUMMARY OF THE INVENTION

It is, therefore, an object of the present invention to provide a Brillouin/erbium-fiber laser system producing multiwavelengths with a dual spacing of 10 GHz and 20 GHz.

It is another object of the present invention to provide a laser sensor using Brillouin/erbium-fiber laser generating multiwavelengths of a dual spacing.

In accordance with an aspect of the invention, there is provided an optical fiber laser system comprising: a Sagnac reflector generating even- and odd-order Stokes waves by launching input lights; a first means forming a first resonator with the Sagnac reflector, wherein the first means is coupled to a first directional coupler in the Sagnac reflector; a second means forming a second resonator with the Sagnac reflector, wherein the second means is coupled to the first directional coupler in the Sagnac reflector; and a third means for inputting Brillouin pump light into one of the first and second means, whereby the optical fiber laser system outputs multiwavelengths with a dual spacing.

The first means outputs even-order Brillouin Stokes waves and wherein the second means outputs odd-order Brillouin Stokes waves. The first means includes a second directional coupler coupled to the first directional coupler in the Sagnac reflector, transferring the Brillouin pump light to the Sagnac reflector; a first light amplifier coupled to the second directional coupler; a first wavelength division multiplexer coupled to the first light amplifier; and a third directional coupler coupled to the first wavelength division multiplexer for detecting an output of light. Also, the second means includes: a second light amplifier coupled to the first directional coupler in the Sagnac reflector; a second wavelength division multiplexer coupled to the second light amplifier; and a fourth directional coupler coupled to the wavelength division multiplexer for detecting an output of light.

Further, the first and second light amplifiers are Erbium Doped Fibers and the optical fiber laser system further comprises a fifth directional coupler coupled to the third and fourth directional coupler for receiving a pump light to achieve reverse of density of the Erbium Doped Fibers.

In the multiwavelength Brillouin/erbium-fiber laser according to the present invention, an optical fiber Sagnac reflector receives the Brillouin/erbium scattering pumped light from a single wavelength of an optical fiber laser and generates two kinds of multiwavelengths which are different from each other in their spacing. According to the multiwavelength Brillouin/erbium-fiber laser of the present invention, a directional coupler of the Sagnac reflector having a stimulated Brillouin/erbium scattering medium is coupled to the first and second optical fiber mirrors so that the coupling of the Sagnac reflector to the first optical fiber mirror and the coupling of the Sagnac reflector to the second optical fiber mirror respectively implement first and second laser resonators.

The Sagnac reflector, which is shared with the first and second laser resonators, includes an optical fiber (Brillouin/erbium scattering medium) of a few kilometers and a polarization controller for controlling birefringence. Even- and odd-order lights, which are different from each other in Brillouin scattering characteristics, of continuously oscillated multiwavelength Brillouin laser lights may be resonated in each laser resonator under the control of the polarization controller in the Sagnac reflector. Accordingly, the multiwavelengths are output in 10 GHz and 20 GHz spacing.

BRIEF DESCRIPTION OF THE DRAWINGS

Other objects and aspects of the invention will become apparent from the following description of the embodiments with reference to the accompanying drawings, in which:

FIG. 3 is a plot illustrating an output spectrum of the proposed Brillouin/erbium-fiber laser system outputs multi-wavelengths of 20 GHz spacing according to the present invention

DETAILED DESCRIPTION OF THE PREFERRED EMBODIMENTS

Hereinafter, a Brillouin/erbium-fiber laser system according to the present invention will be described in detail referring to the accompanying drawings.

Figure 1:
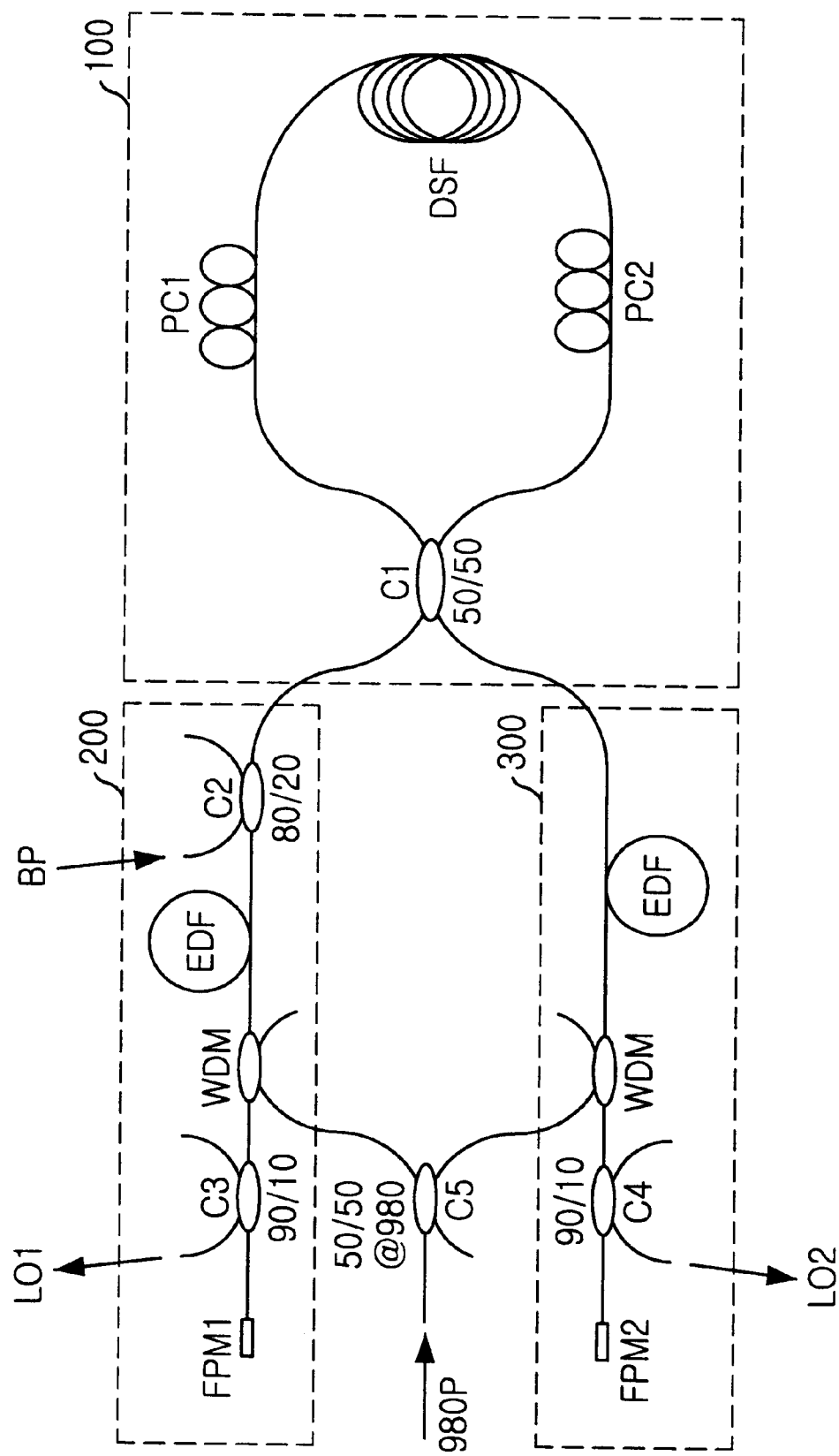
FIG. 1 is a schematic view illustrating a Brillouin/erbium-fiber laser system with a dual spacing in accordance with the present invention.

First, FIG. 1 is a schematic view illustrating the Brillouin/erbium-fiber laser system with a dual spacing in accordance with the present invention. Referring to FIG. 1, the Brillouin/erbium-fiber laser system according to the present invention includes a Sagnac reflector 100 and two linear units 200 and 300, which from laser resonators, connected to the Sagnac reflector 100. Further, the Sagnac reflector 100 includes a dispersion-shifted fiber (DSF) of a few kilometers as a stimulated Brillouin scattering (SBS) medium, a pair of polarization controllers PC1 and PC2 and a 50-50 directional coupler C1. As a result, the Sagnac reflector 100 is shared with each of two metal coated fiber planar mirrors FPM1 and FPM2, thereby forming two laser cavities. In another embodiment, a Faraday rotator mirror or a fiber loop mirror may be used instead of the metal coated fiber planar mirrors FPM1 and FPM2 and the stimulated Brillouin scattering mediums may be replaced with other optical fibers, such as a single mode fiber (SMF) and a dispersion-compensated fiber (DCF).

The fiber polarization controllers PC1 and PC2 in the Sagnac reflector 100 control the reflection characteristics of the Sagnac reflector 100, by adjusting phase offsets between two counter propagating lights in the Sagnac reflector.

When the Sagnac reflector 100 is set in complete reflection made by adjusting the polarization controllers PC1 and PC2 inside the Sagnac reflector 100, the Brillouin pump light BP launched into the Sagnac reflector 100 through an 80/20 directional coupler C2 of the linear unit 200 is totally reflected back to the linear unit 200. At this time, first order Brillouin Stokes waves, which are induced by the Brillouin pump light BP in the dispersion-shifted fiber (DSF), is totally transmitted to the linear unit 300, because they are induced in the opposite direction to the Brillouin pump light BP. Moreover, the first order Brillouin Stokes waves outputted to the linear unit 300 is reflected by the metal coated fiber planar mirror FPM2 and them re-launched into the Sagnac reflector 100 through the reverse path of the linear unit 300. Since the Sagnac reflector 100 is set in complete reflection mode, this first order Stokes wave forms a cavity resonance between the metal coated fiber planar mirror FPM2 and the Sagnac reflector 100. Similarly, the second order Stokes wave generated by the first order Stokes wave in the Sagnac reflector 100 forms a cavity resonance between the metal coated fiber planar mirror FPM1 and the Sagnac reflector 100. The third order Stokes wave generated by the second order Stokes wave also forms a cavity resonance between the metal coated fiber planar mirror FPM2 and the Sagnac reflector 100, and so on.

The light waves reflected and transmitted from the Sagnac reflector 100 to the linear units 200 and 300 are amplified, passing through a gain medium, EDF (Erbium Doped Fiber), and are outputted via 90/10 directional couplers C3 and C4 as laser outputs LO1 and LO2. The population inversion of the EDF is achieved by the 960 nm pumping light launched through 50/50 directional coupler C5 and the 960/1550 WDM (wavelength division multiplexing) coupler in each of the linear units 200 and 300.

The Brillouin/erbium-fiber laser system according to the present invention outputs multiwavelength laser beams with a dual spacing of 10 GHz and 20 GHz, by controlling birefringence of the Sagnac reflector 100.

Figure 2:
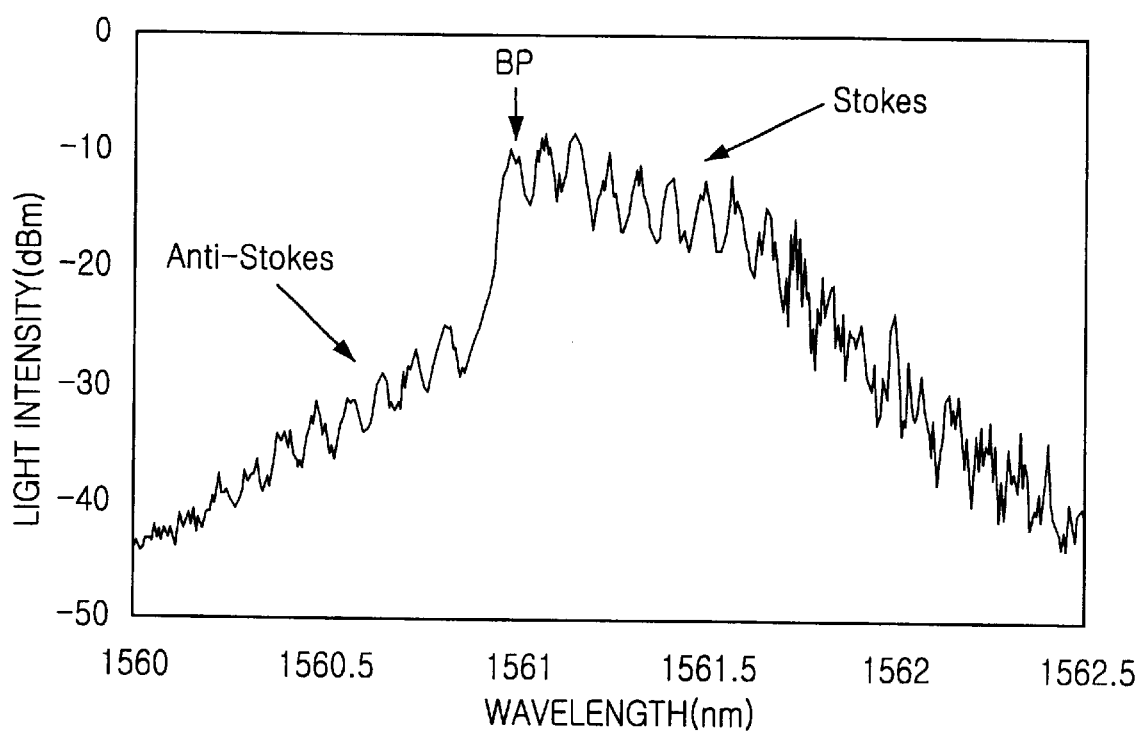
FIG. 2 is a plot illustrating an output spectrum of the Brillouin/erbium-fiber laser system in FIG. 1 outputting conventional 10 GHz spacing multiwavelength waves according to the present invention.

FIG. 2 is a plot illustrating an output spectrum of the proposed Brillouin/erbium-fiber laser system in FIG. 1 outputting conventional 10 GHz line spacing multiwavelength waves, and FIG. 3 is a plot illustrating an output spectra of this Brillouin/erbium-fiber laser system outputting 20 GHz line spacing multiwavelength waves. In FIG. 3, the dashed line is the spectrum for the even order Stokes waves LO1 outputted from the directional coupler C3, and the solid line is for the odd order Stokes waves LO2 from the directional coupler C4.

The variation of physical objects, such as temperature, pressure, current, magnetic field, and so on, can be sensed by measuring the relative variation of light intensity of 10 GHz and 20 GHz spacing signals. For example, in case where the Sagnac reflector 100 is adjusted in order that the odd- and even-order Brillouin Stokes waves are all the same in their magnitude, a variation of physical objects to be measured has an effect on such a reflection condition of the Sagnac reflector 100. Since any kind of perturbations that affect the operation property of the Sagnac reflector change the light intensity's ratio of the 10 GHz waves to the 20 GHz waves, this laser system can be used as a fiber optic sensor by measuring such light intensity ratio.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A Brillouin/erbium fiber laser system for producing multiwavelength optical outputs with a dual spacing of 10 GHz and 20 GHz, comprising:

a Sagnac reflector including a Brillouin gain medium, a coupling means connected to two ends of the Sagnac reflector, and fiber polarization controllers adjusting the birefringence of the Brillouin gain medium so that the spacing of the multiwavelength optical outputs is adjusted to either 10 GHz or 20 GHz;

a first linear section acting as a first resonator with the Sagnac reflector and including a first output fiber coupler for outputting the multiwavelength optical outputs, a Brillouin pump input fiber coupler for coupling a Brillouin pump light provided from an external device into the Sagnac reflector to thereby produce a laser light, a first optical amplifier, and a first fiber planar mirror for reflecting the laser light in the first resonator to the Sagnac reflector; and a second linear section acting as a second resonator with the Sagnac reflector and including a second output fiber coupler for outputting the multiwavelength optical outputs, a second optical amplifier, and a second fiber planar mirror for reflecting the laser light in the second resonator to the Sagnac reflector, wherein the laser light resonates between the Sagnac reflector and the first and second linear sections, and the first and second linear sections alternately output the resonating laser light as the multiwavelength optical outputs through the first and second output fiber couplers, respectively.

2. The Brillouin/erbium fiber laser system as recited in claim 1, wherein the first linear section outputs one of even- and odd-order multiwavelength Brillouin Stokes waves as the multiwavelength optical outputs and the second linear section outputs the other-order multiwavelength Brillouin Stokes waves as the multiwavelength optical outputs by adjusting the fiber polarization controllers in the Sagnac reflector which controls the birefringence of the Brillouin gain medium.

3. The Brillouin/erbium fiber laser system as recited in claim 1, wherein the first and second optical amplifiers employ erbium doped fibers.

4. The Brillouin/erbium fiber laser system as recited in claim 3, further comprising:

a first wavelength division multiplexing (WDM) coupler for coupling a pumping light into the first optical amplifier, which amplifies the laser light by using said pumping light;

a second WDM coupler for coupling said pumping light into the second optical amplifier which amplifies the laser light by using said pumping light; and a directional coupler for providing said pumping light to the first and second WDM couplers so as to pump the first and second optical amplifiers.

5. The Brillouin/erbium fiber laser system as recited in claim 1, wherein the Brillouin gain medium employs an optical fiber.

6. The Brillouin/erbium fiber laser system as recited in claim 1, wherein the first and second fiber planar mirrors employ one selected from the group consisting of a metal coated fiber planar mirror, a Faraday rotator mirror and an optical fiber loop mirror.

7. The Brillouin/erbium fiber laser system as recited in claim 1, wherein the coupling means is a 50/50 directional coupler.

* * * * *